(12) United States Patent
Xu

(10) Patent No.: US 8,225,340 B2
(45) Date of Patent: Jul. 17, 2012

(54) SLIM OPTICAL DISC DRIVE FOR NOTEBOOK COMPUTER

(75) Inventor: Zhong Xu, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/843,066

(22) Filed: Jul. 26, 2010

(65) Prior Publication Data

US 2011/0247022 A1    Oct. 6, 2011

(30) Foreign Application Priority Data

Mar. 30, 2010    (CN) .......................... 2010 1 0136105

(51) Int. Cl.
*G11B 7/00*    (2006.01)

(52) U.S. Cl. ...................... 720/667; 720/695; 369/30.27

(58) Field of Classification Search .......... 720/601–616, 720/619–626, 695; 369/30.27, 33.01, 53.2, 369/53.41
See application file for complete search history.

(56) References Cited

U.S. PATENT DOCUMENTS

| | | | | |
|---|---|---|---|---|
| 8,000,097 B2 * | 8/2011 | Yamamoto et al. | ...... | 361/679.37 |
| 2002/0021655 A1 * | 2/2002 | Shin | ............... | 369/247 |
| 2004/0027962 A1 * | 2/2004 | Kabasawa | .................... | 369/75.2 |
| 2004/0244019 A1 * | 12/2004 | Kim et al. | ...................... | 720/603 |
| 2006/0242659 A1 * | 10/2006 | Shimada et al. | .............. | 720/651 |
| 2007/0162916 A1 * | 7/2007 | Omori | ............................ | 720/601 |
| 2008/0263574 A1 * | 10/2008 | Yamamoto et al. | ........... | 720/600 |
| 2008/0301724 A1 * | 12/2008 | Takasawa | .................... | 720/648 |
| 2010/0050191 A1 * | 2/2010 | Taka et al. | ..................... | 720/601 |
| 2010/0262980 A1 * | 10/2010 | Matsumoto et al. | .......... | 720/610 |

* cited by examiner

*Primary Examiner* — Tan X Dinh
(74) *Attorney, Agent, or Firm* — Altis Law Group, Inc.

(57) ABSTRACT

An optical disc drive for an electronic device is provided. The optical disc drive includes a rotating member, a spindle, a reading member and a controlling module. The rotating member includes a connecting member, and a first end fixed to a housing of the electronic device. The spindle is connected to a second end of the connecting member for rotating an optical disc arranged on the spindle. The reading member is fixed to the connecting member to read the optical disc. When a switch of the electronic device is actuated, a processing unit of the electronic device outputs a signal to the controlling module. The controlling module controls the rotating member to rotate. The connecting member moves the spindle and the reading member out of the housing, further controls the spindle to rotate the optical disc, and the reading member to read the optical disc.

11 Claims, 7 Drawing Sheets

SLIM OPTICAL DISC DRIVE FOR NOTEBOOK COMPUTER

BACKGROUND

1. Technical Field

The present disclosure relates to optical disc drives and, particularly, to an optical disc drive requiring less mounting space.

2. Description of Related Art

To decrease the size of notebook computers, optical disc drives may be omitted, and users can use an external optical disc drive if they wish. However, it may not always be convenient to take along an external optical disc drive. It is thus desirable to provide an internal optical disc drive requiring less space to facilitate slim design of a notebook computer.

BRIEF DESCRIPTION OF THE DRAWINGS

The components of the drawings are not necessarily drawn to scale, the emphasis instead being placed upon clearly illustrating the principles of optical disc drive. Moreover, in the drawings, like reference numerals designate corresponding parts throughout several views.

DETAILED DESCRIPTION

Figure 1:
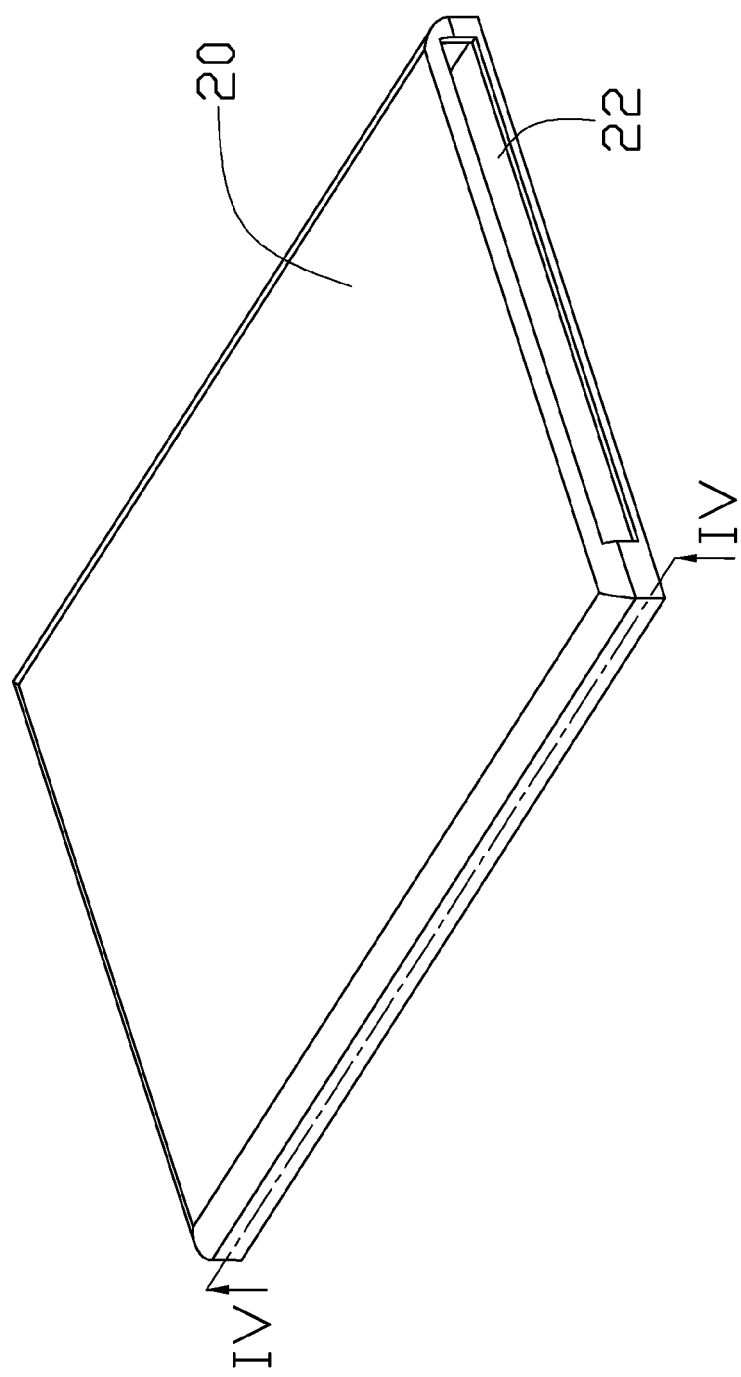
FIG. 1 is a perspective view of an optical disc drive in a first state in accordance with an exemplary embodiment.
Figure 2:
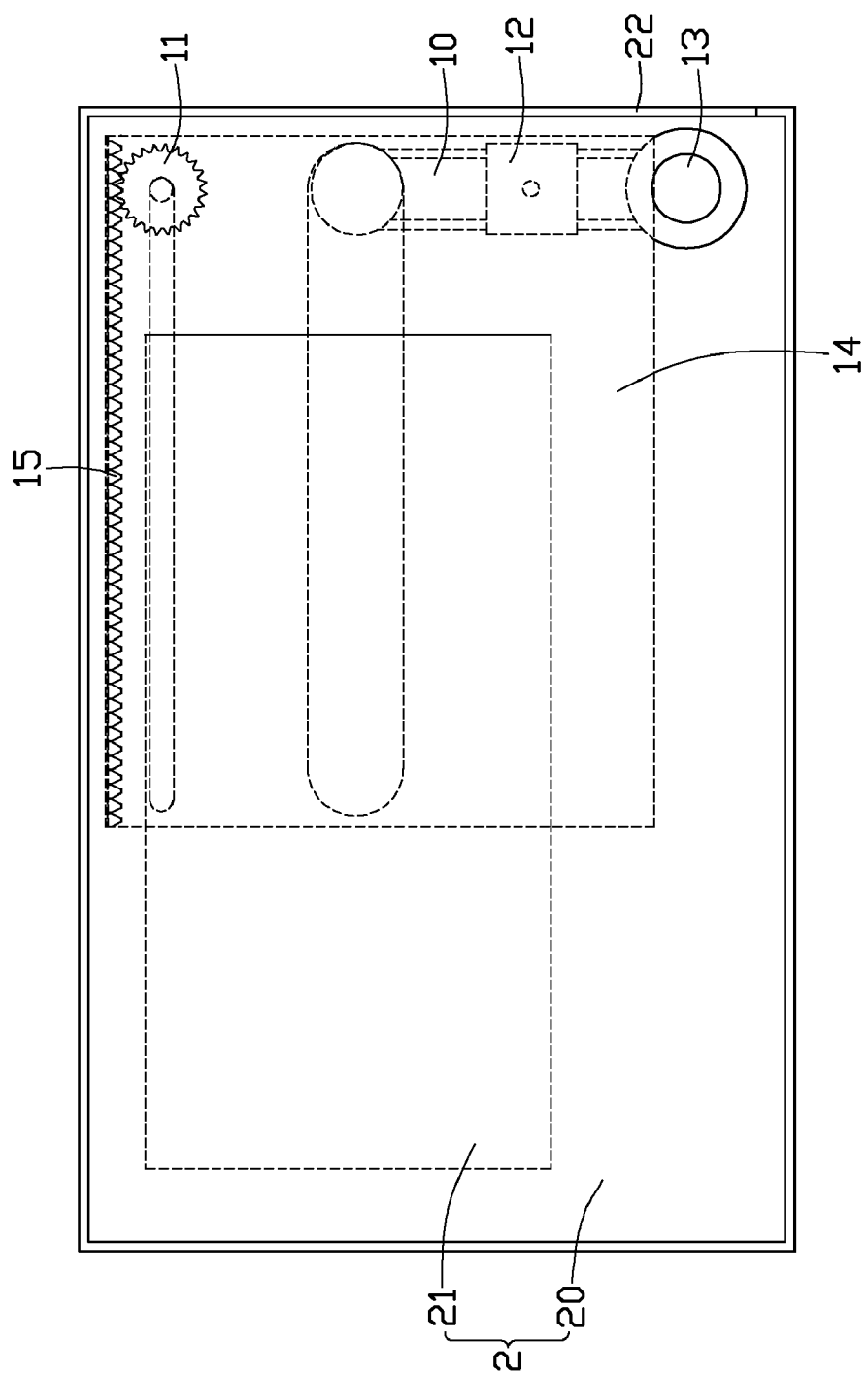
FIG. 2 is a plan view of the optical disc drive of FIG. 1.
Figure 3:
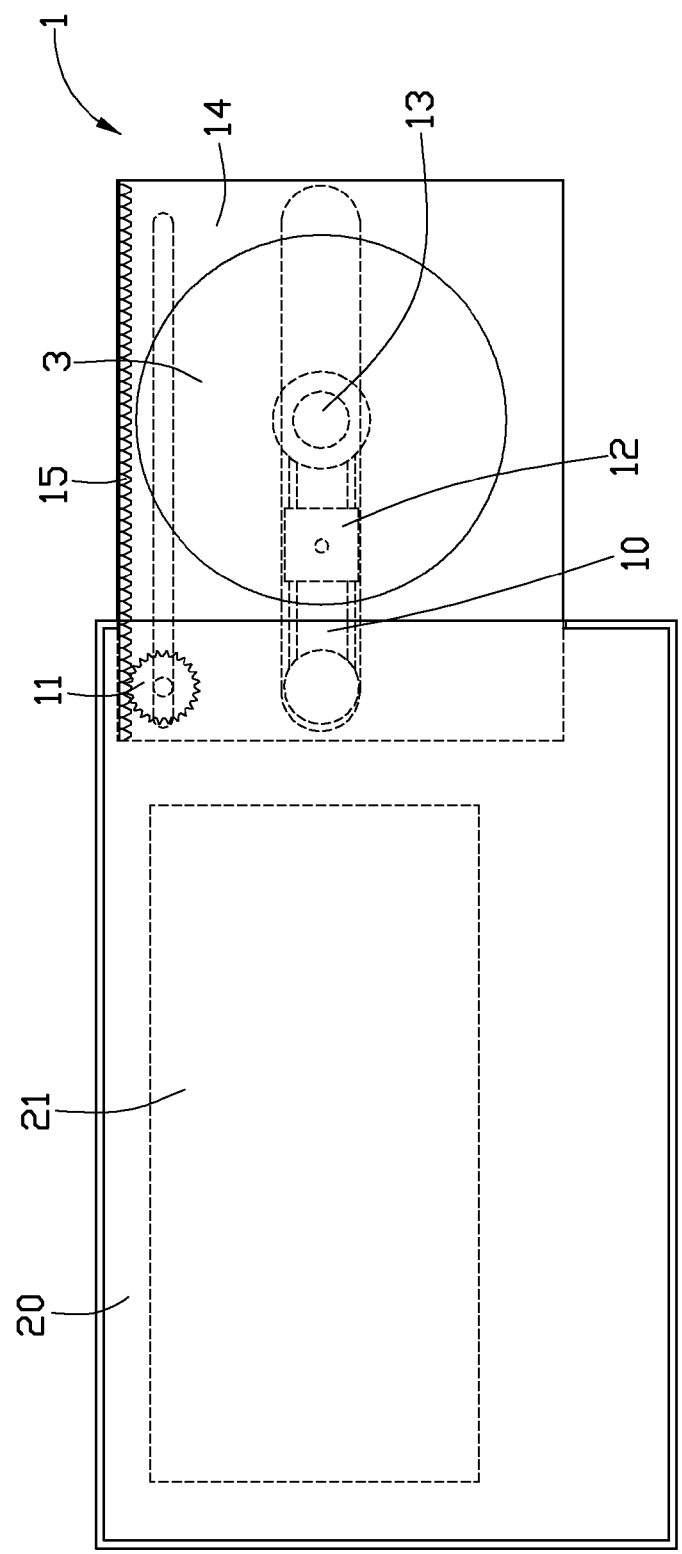
FIG. 3 is similar to FIG. 2, showing the optical disc drive in a second state.

Embodiments of the present disclosure will now be described in detail below, with reference to the accompanying drawings. Referring to FIGS. 1-3, an optical disc drive 1 is configured to read an optical disc 3 in an electronic device 2. In the embodiment, the electronic device 2 can be a notebook computer.

The electronic device 2 includes a housing 20 and a circuit board 21. A sidewall of the housing 20 defines an opening 22. The main board 21 is arranged in the housing 20.

The optical disc drive 1 includes a rotating member 10, a gear 11, a reading member 12, a spindle 13, and a tray 14.

Figure 4:
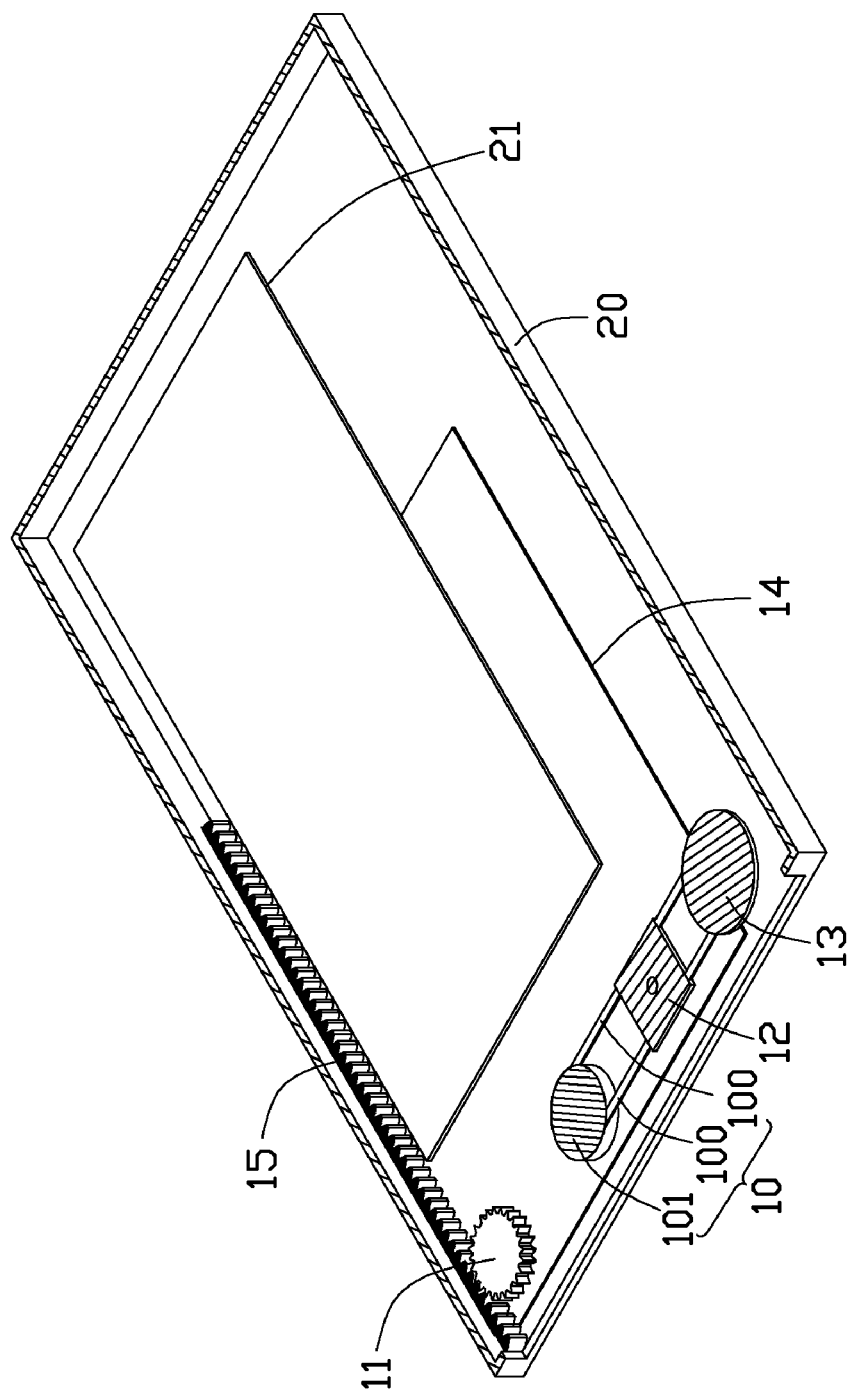
FIG. 4 is a section view of the optical disc drive of FIG. 1, taken along line IV-IV of FIG. 1.
Figure 5:
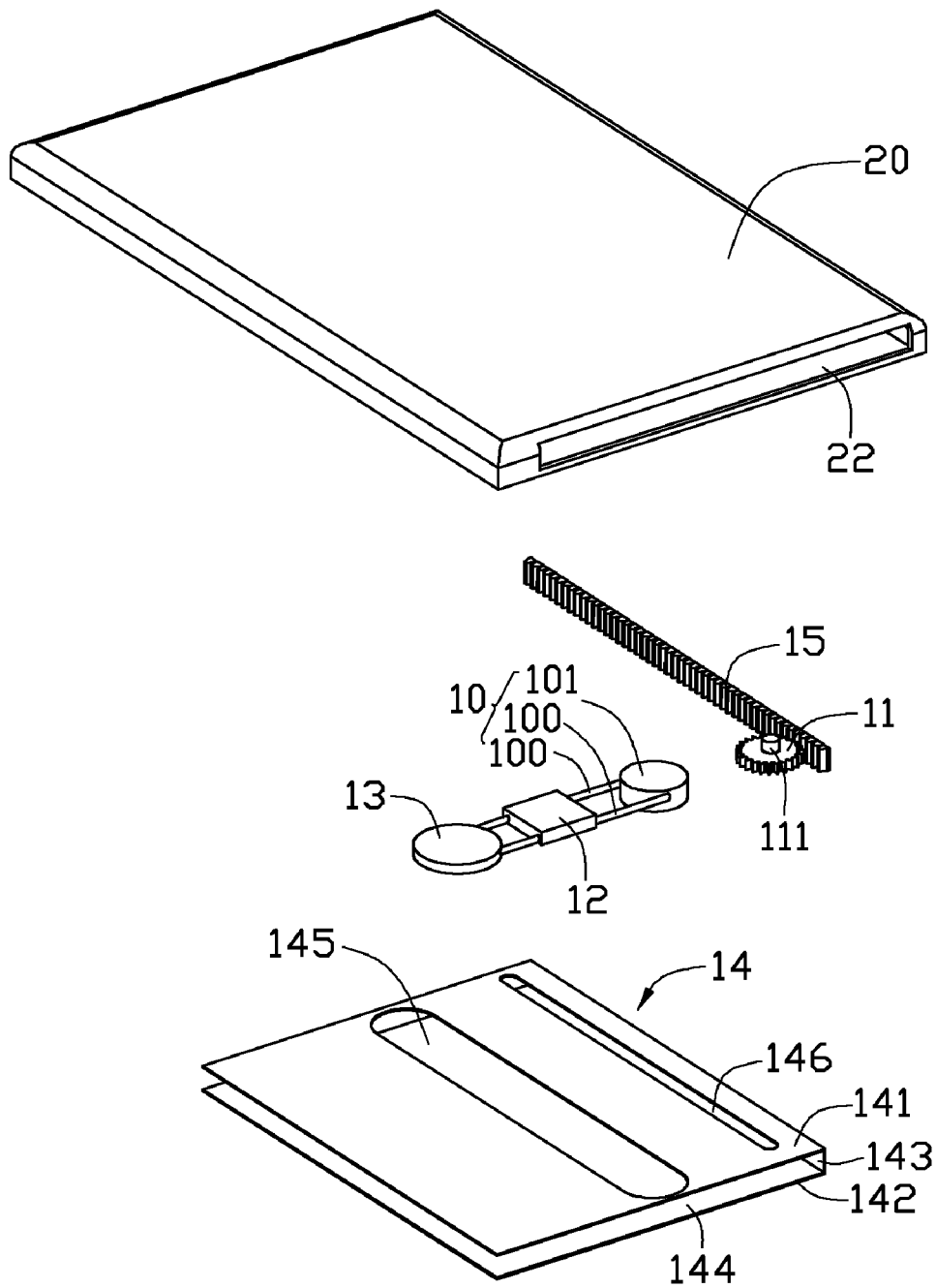
FIG. 5 is an exploded view of the optical disc drive of FIG. 1.

Referring to FIGS. 4-5, the rotating member 10 includes a connecting member 100 and a rotating column 101. In the embodiment, the connecting member 100 is two rigid rod-like connecting members 100, in other embodiments there may be one or more than two connecting members 100. The rotating column 101 is rotatably connected to the housing 20. One end of each of the connecting members 100 is fixed to the lateral surface of the rotating column 101. The spindle 13 is connected to the other ends of the connecting members 100. The spindle 13 can be driven by a first driving member 130 (see FIG. 6) to rotate the optical disc 3. The reading member 12 is attached to the connecting members 100 and arranged between the rotating column 101 and the spindle 13. The rotating column 101 can be driven by a second driving member 102 (see FIG. 6), such as a motor. When the rotating column 101 rotates, the connecting members 100, the reading member 12, and the spindle 13 rotate as a unit about the rotating axis of the rotating column 101. In the embodiment, the length of the connecting members 100 is less than the width of the opening 22.

The tray 14 is substantially square and includes a first main body 141, a second main body 142 substantially parallel to the first main body 141, and a connecting wall 143 connecting the first main body 141 to the second main body 142. In the embodiment, the first main body 141 and the second main body 142 are substantially the same in structure. Together, the main bodies 141 and 142 define a receiving space 144 to partly receive the circuit board 21, and to receive the rotating member 10. In the embodiment, the width of the tray 14 is less than that of the opening 22.

The second main body 142 defines a groove 145 and a slot 146. The groove 145 and the slot 146 both are substantially parallel to each other. The rotating column 101 is received in the groove 145. A rack 15 is attached on the connecting wall 143. The gear 11 engaging with the rack 15 is rotatably connected to the housing 20. The gear 11 includes an axle 111 fixed to the housing 20 and received in the slot 146. The gear 11 can be driven to rotate by a third driving device 110 (see FIG. 6), such as a motor. When the gear 11 rotates, the rack 15 engages with the gear 11 and moves the tray 14 out of or into the housing 20 through the opening 22.

Figure 6:
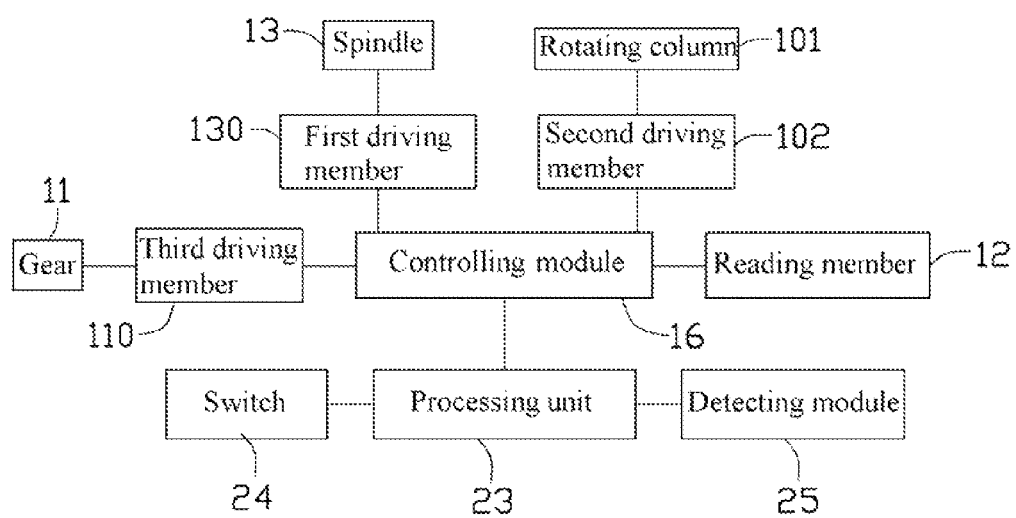
FIG. 6 is a block diagram of the optical disc drive of FIG. 1.
Figure 7:
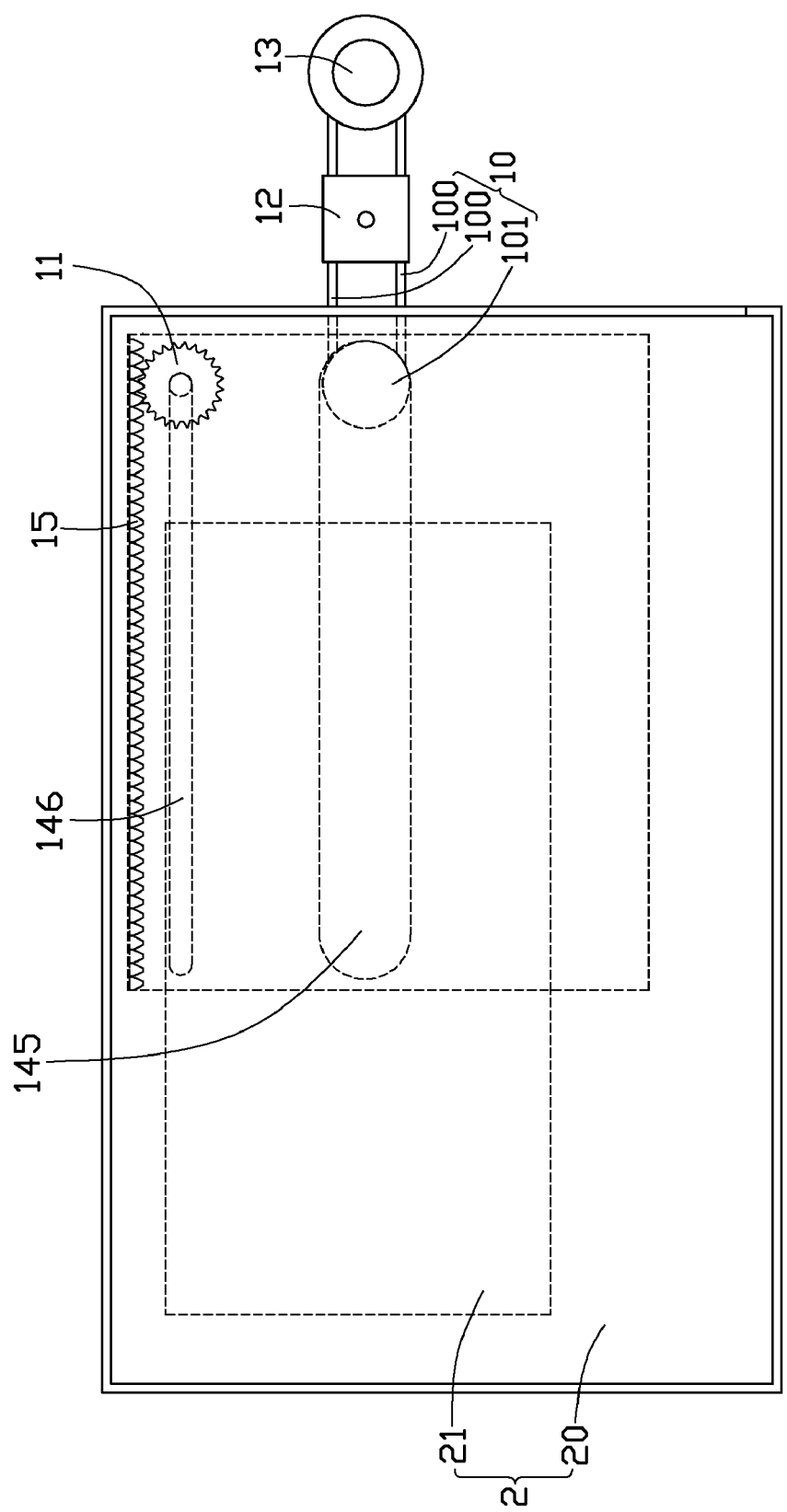
FIG. 7 is similar to FIG. 2, showing the optical disc drive in a third state.

Referring to FIG. 6, the electronic device 2 includes a processing unit 23 and a switch 24. The processing unit 23 is arranged in the housing 20. The optical disc drive 1 further includes a controlling module 16. When the switch 24 is triggered, the processing unit 23 outputs a signal to the controlling module 16. The controlling module 16 controls the second driving member 102 to drive the rotation of the rotating column 101 and the third driving member 110 to drive the rotation of the gear 11. The rotating column 101 rotates the connecting members 100, the reading member 12, and the spindle 13 out of the housing 20. The gear 11 rotates to engage with the rack 15 to move the tray 14 out of the housing. A detecting module 25 is fixed to the tray 14 and configured to detect whether the optical disc 3 is arranged on the spindle 13. If so, the controlling module 16 further controls the first driving member 130 to drive the spindle 13 to rotate the optical disc 3 and the reading member 12 to read the optical disc 3.

Referring to FIG. 6, when the switch 24 is triggered, the processing unit 23 outputs the signal to the controlling module 16 to control the second driving member 102 to rotate the rotating column 101 to rotate the rotating member 10 out of the housing 20, and to control the third driving member 110 to drive the gear 11 to rotate to engage with the rack 15 to bring the tray 14 out of the housing 20. When the tray 14 is completely extended from the housing 20, the reading member 12 and the spindle 13 are received in the receiving space 144. When the detecting module 25 detects that the optical disc 3 is arranged on the spindle 13, the processing unit 23 outputs the signal to the controlling module 16 to control the first driving member 130 to rotate the spindle 13 to rotate the optical disc 3, and to move the reading member 12 to read the optical disc.

When the detecting module 25 detects that no optical disc is on the spindle 13 and the switch 24 is triggered, the processing unit 23 outputs the signal to the controlling module 16 to control the second driving member 102 to rotate the rotating member 10, and the third driving member 110 to rotate the gear 11 to engage with the rack 15 to bring the tray 14 inside the housing 20 through the opening 22. When the tray 14 is completely inside the housing 20, the main board 21 is partly received in the receiving space 144.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An optical disc drive for an electronic device, comprising:
   a rotating member comprising a connecting member and a first end fixed to a housing of the electronic device;
   a spindle connected to a second end of the connecting member for rotating an optical disc arranged on the spindle;
   a reading member fixed to the connecting member to read the optical disc; and
   a controlling module for controlling to rotate the rotating member and the spindle, and controlling the reading member to read the data of the optical disc;
   wherein when a switch of the electronic device is actuated, a processing unit of the electronic device outputs a signal to the controlling module, the controlling module controls the rotating member to rotate, the connecting member rotates with the rotating member to bring the spindle and the reading member out of the housing of the electronic device, and the controlling module further controls the spindle to rotate the optical disc and the reading member to read the data of the optical disc.

2. The optical disc drive as described in claim 1, further comprising a first driving member, the first driving member responding to the controlling module to drive the spindle to rotate the optical disc.

3. The optical disc drive as described in claim 1, wherein the rotating member further comprises a rotating column, the rotating column is rotatably connected to the housing, and one end of the rotating member is attached to a lateral surface of the rotating column.

4. The optical disc drive described in claim 3, further comprising a second driving member, wherein the second driving member responds to the controlling module to drive the rotation of the rotating column.

5. The optical disc drive as described in claim 3, wherein the reading member is arranged between the rotating column and the spindle.

6. The optical disc drive as described in claim 3, further comprising a tray, wherein the tray comprises a first main body, a second main body, and a connecting wall connected to the first main body and the second main body, the second main body defines a groove, the rotating column is received in the groove.

7. The optical disc drive as described in claim 6, wherein the first main body and the second main body define a receiving space, after the tray completely rotates outside the housing, the receiving space is configured to receive the optical disc.

8. The optical disc drive as described in claim 6, further comprising a gear, a third driving member, and a rack, wherein the tray comprises a slot, the gear is received in the slot and rotatably connected to the housing of the electronic device, the third driving member responds to the controlling module to control the gear to rotate engaging with the rack to bring the tray out or inside of the housing.

9. The optical disc drive as described in claim 6, wherein the width of an opening of the housing of the electronic device is wider than the length of the rotating member and the width of the tray, the rotating member and the tray enter into or out of the housing through the opening.

10. The optical disc drive as described in claim 7, wherein a main board of the electronic device is partly received in the receiving space when the tray is inside the housing.

11. The optical disc drive as described in claim 1, wherein the processing unit outputs the signal to the controlling module to control the spindle to rotate the optical disc and the reading member to read the data of the optical disc when a detecting module of the electronic device detects that the optical disc is arranged on the spindle.

* * * * *